United States Patent
Clavizzao

(10) Patent No.: US 10,196,202 B1
(45) Date of Patent: Feb. 5, 2019

(54) GARBAGE BAG RETAINER FOR AN AUTOMOBILE

(71) Applicant: Kane Clavizzao, Sandy Springs, GA (US)

(72) Inventor: Kane Clavizzao, Sandy Springs, GA (US)

(*) Notice: Subject to any disclaimer, the term of this patent is extended or adjusted under 35 U.S.C. 154(b) by 0 days.

(21) Appl. No.: 15/620,940

(22) Filed: Jun. 13, 2017

(51) Int. Cl.
B65F 1/00 (2006.01)
B65F 1/14 (2006.01)

(52) U.S. Cl.
CPC ............ *B65F 1/0013* (2013.01); *B65F 1/002* (2013.01); *B65F 1/141* (2013.01); *B65F 2210/18* (2013.01); *B65F 2230/134* (2013.01)

(58) Field of Classification Search
CPC ........ B65F 1/0013; B65F 1/002; B65F 1/141; B65F 2230/134; B65F 2210/18
USPC .................................. 220/482, 324; 224/275
See application file for complete search history.

(56) References Cited

U.S. PATENT DOCUMENTS

| | | | | |
|---|---|---|---|---|
| 2,642,038 A * | 6/1953 | Howling | ................. | A01K 31/16 119/346 |
| 2,831,598 A * | 4/1958 | Slavsky | ................. | B65D 25/22 211/88.01 |
| 4,848,709 A | 7/1989 | Kiniry | | |
| 4,979,833 A * | 12/1990 | Cook | ................. | A45C 3/00 383/109 |
| 5,246,190 A | 9/1993 | Swirkal | | |
| 5,323,511 A | 6/1994 | Gray | | |
| 5,676,284 A | 10/1997 | Schenberg | | |
| 5,829,656 A * | 11/1998 | Reitz | ................. | B62B 9/26 224/417 |
| D465,724 S | 11/2002 | Goodman | | |
| 6,863,249 B1 | 3/2005 | Alvord | | |
| 7,163,337 B2 * | 1/2007 | Penson | ................. | D06F 95/004 383/117 |
| 7,377,411 B1 * | 5/2008 | Stewart | ................. | B60R 7/043 224/197 |
| 9,221,406 B2 | 12/2015 | Angara | | |
| 2015/0296947 A1 * | 10/2015 | Berglund | ................. | A45C 13/03 206/279 |

FOREIGN PATENT DOCUMENTS

CN 201759288 U 3/2011

* cited by examiner

*Primary Examiner* — Kareen K Thomas

(57) ABSTRACT

The garbage bag retainer for an automobile is a sack holder. The garbage bag retainer for an automobile is configured for use with an automobile. The garbage bag retainer is attached to a side window of the automobile such that the garbage bag retainer for an automobile hangs on the exterior side of the automobile. The garbage bag retainer for an automobile is configured to hold the disposable trash bag for loading. The garbage bag retainer for an automobile comprises a mesh bag, an access structure, and one or more hooks. The one or more hooks and the mesh bag attach to the access structure. The disposable trash bag is held within the mesh bag. The access structure is a tool that is used to control access to the interior of the disposable trash bag. The one or more hooks attach the invention to the side window.

13 Claims, 4 Drawing Sheets

GARBAGE BAG RETAINER FOR AN AUTOMOBILE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of the storing or handling of thin or filamentary material, more specifically, a sack holder that facilitates the manual packing of material.

SUMMARY OF INVENTION

The garbage bag retainer for an automobile is a sack holder that facilitates the manual packing of material. The garbage bag retainer for an automobile is configured for use with a disposable trash bag. The garbage bag retainer for an automobile is configured for use with an automobile. The automobile is further defined with a body and a side window. The side window is selected from the group consisting of a front side window and a rear side window. The side window is retractable into the body of the automobile thereby allowing the side window to be opened or closed. The garbage bag retainer is attached to the side window such that the garbage bag retainer for an automobile hangs on the exterior side of the automobile. The garbage bag retainer for an automobile is configured to hold the disposable trash bag such that the disposable trash bag may be readily loaded. The garbage bag retainer for an automobile comprises a mesh bag, an access structure, and one or more hooks. The one or more hooks and the mesh bag attach to the access structure. The disposable trash bag is held within the mesh bag. The access structure is a tool that is used to control access to the interior of the disposable trash bag. The one or more hooks attach the invention to the side window.

These together with additional objects, features and advantages of the garbage bag retainer for an automobile will be readily apparent to those of ordinary skill in the art upon reading the following detailed description of the presently preferred, but nonetheless illustrative, embodiments when taken in conjunction with the accompanying drawings.

In this respect, before explaining the current embodiments of the garbage bag retainer for an automobile in detail, it is to be understood that the garbage bag retainer for an automobile is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the garbage bag retainer for an automobile.

It is therefore important that the claims be regarded as including such equivalent construction insofar as they do not depart from the spirit and scope of the garbage bag retainer for an automobile. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
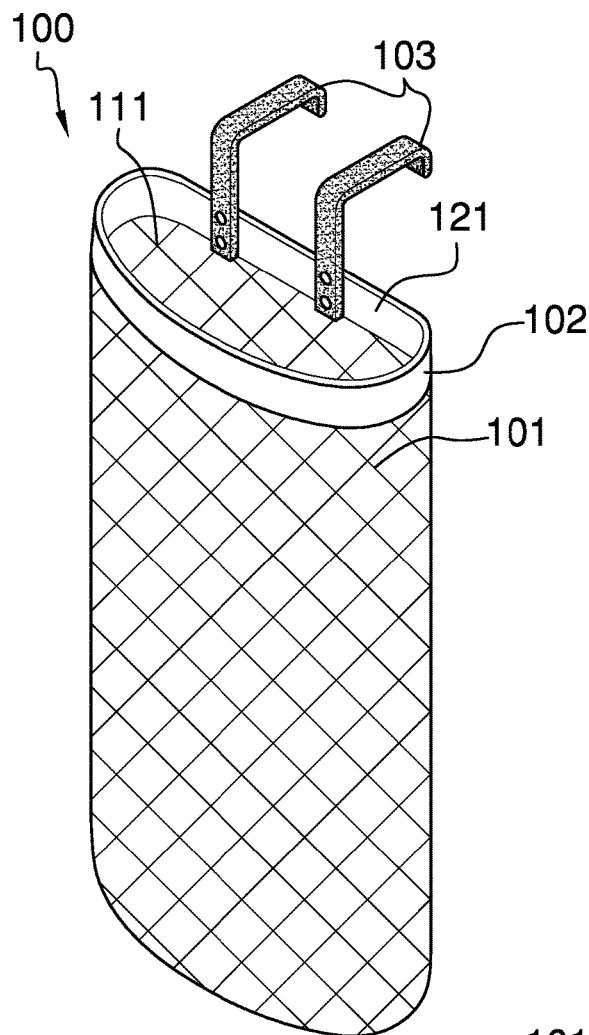
FIG. 1 is a perspective view of an embodiment of the disclosure.
Figure 2:
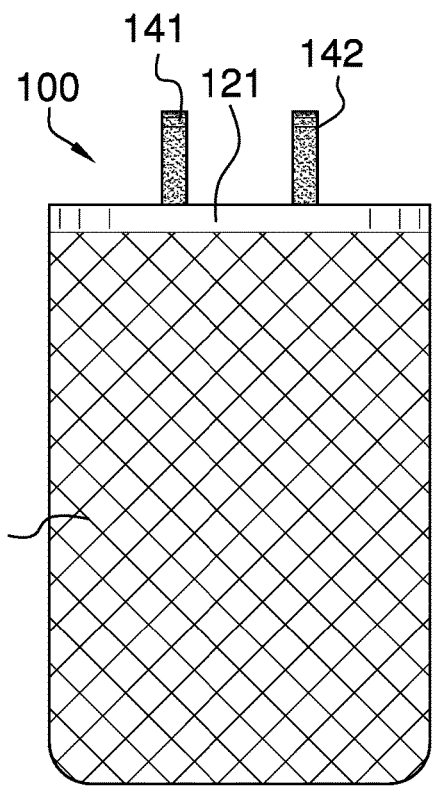
FIG. 2 is a front view of an embodiment of the disclosure.
Figure 3:
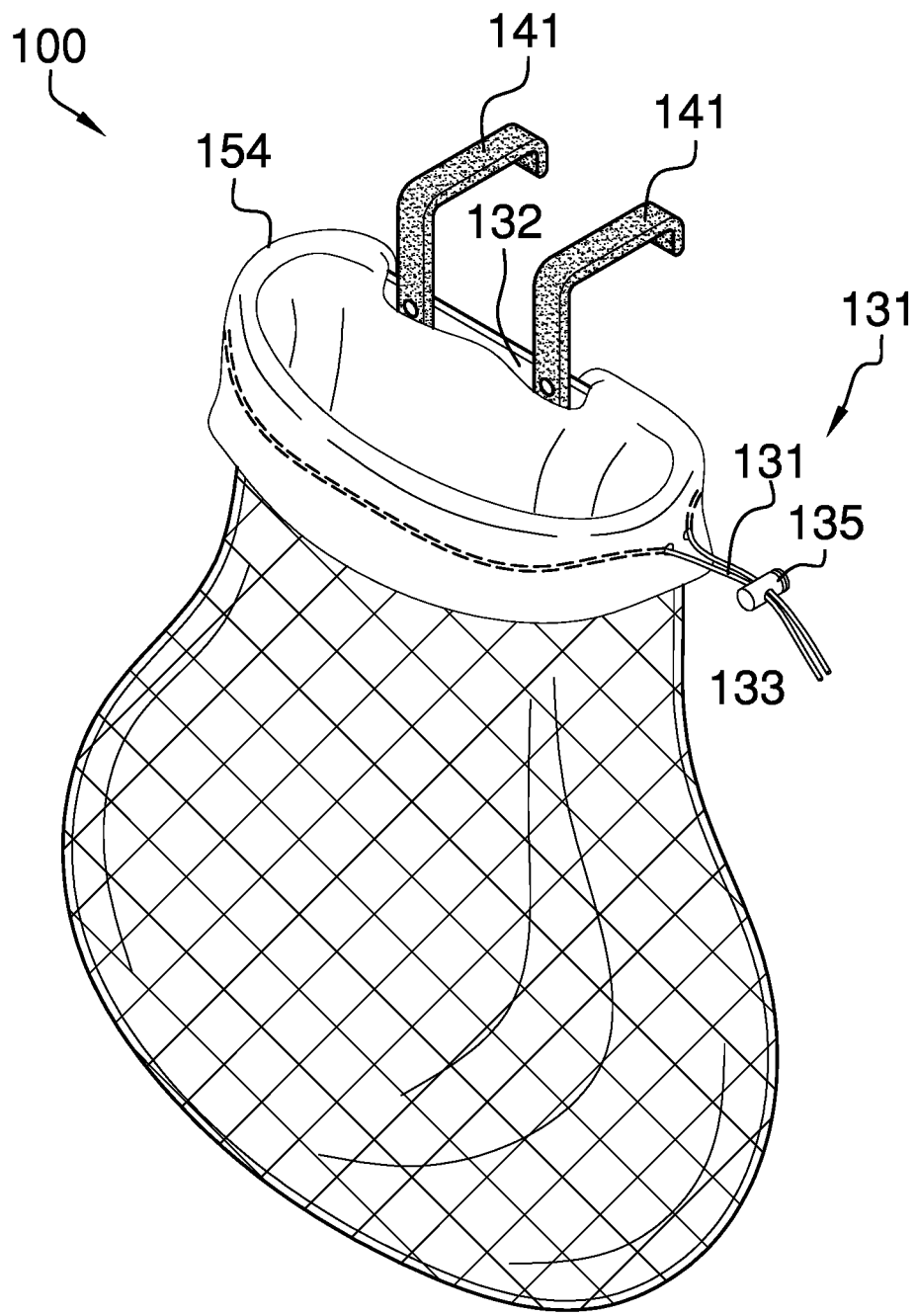
FIG. 3 is an in use view of an embodiment of the disclosure.
Figure 4:
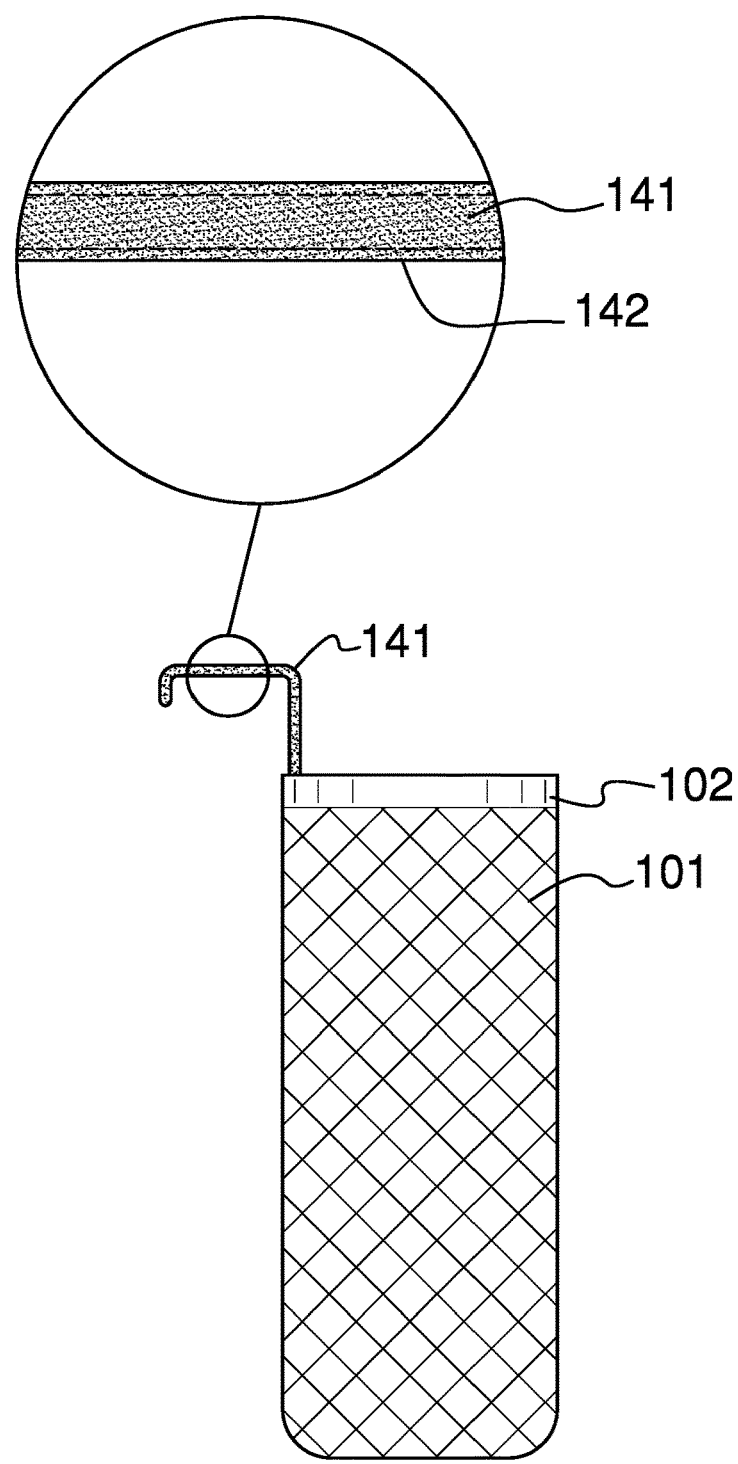
FIG. 4 is a side view of an embodiment of the disclosure.
Figure 5:
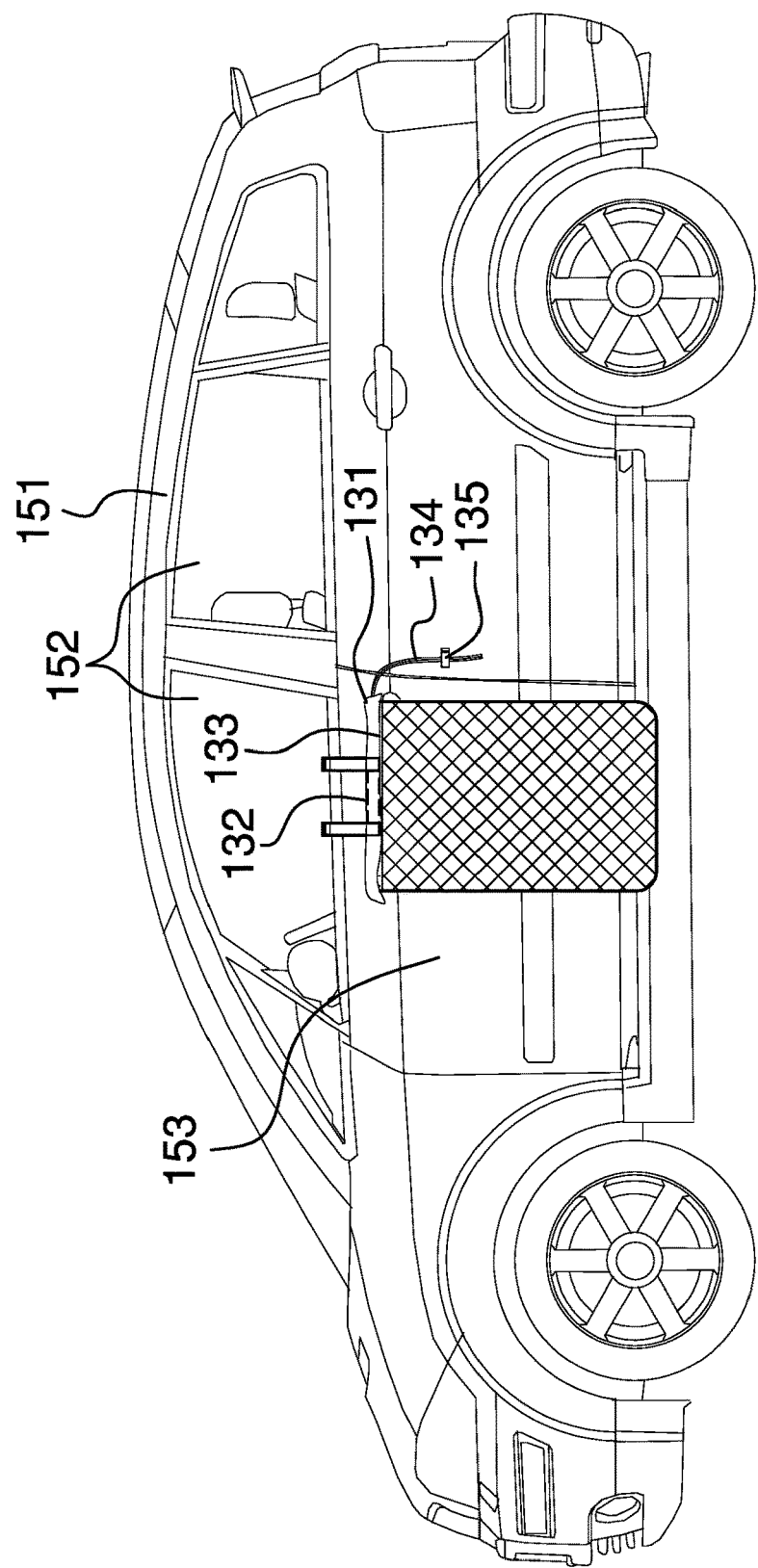
FIG. 5 is an in use view of an embodiment of the disclosure.

Detailed reference will now be made to one or more potential embodiments of the disclosure, which are illustrated in FIGS. 1 through 5.

The garbage bag retainer for an automobile 100 (hereinafter invention) is a sack holder that facilitates the manual packing of material.

The invention 100 is configured for use with a disposable trash bag 154. The disposable trash bag 154 is a readily and commercially available flexible receptacle that is used to line the mesh bag 101. The invention 100 is configured for use with an automobile 151. The automobile 151 is a motorized vehicle that is intended to carry passengers and cargo over a road network. The automobile 151 is further defined with a body 153 and a side window 152. The side window 152 is a transparent surface of the automobile 151 that provides visibility into and out of the interior of the automobile 151. The body 153 is the non-transparent structure that forms the automobile 151. The side window 152 is selected from the group consisting of a front side window 152 and a rear side window 152. The side window 152 is retractable into the body 153 of the automobile 151 thereby allowing the side window 152 to be opened or closed. The invention 100 is attached to the side window 152 such that the invention 100 hangs on the exterior side of the automobile 151.

The invention 100 is configured to hold the disposable trash bag 154 such that the disposable trash bag 154 may be readily loaded. The invention 100 comprises a mesh bag 101, an access structure 102, and one or more hooks 103. The one or more hooks 103 and the mesh bag 101 attach to the access structure 102. The disposable trash bag 154 is held within the mesh bag 101. The access structure 102 is a tool that is used to control access to the interior of the disposable trash bag 154. The one or more hooks 103 attach the invention 100 to the side window 152.

The mesh bag 101 is a commercially available bag that is formed from a mesh textile. The mesh bag 101 is sized to receive a disposable trash bag 154. The mesh bag 101 is further defined with an opening 111. The opening 111 is the aperture that is traditionally found within a bag that allows access into the interior of the mesh bag 101.

The access structure 102 attaches to the opening 111 of the mesh bag 101. The access structure 102 is a tool that facilitates and controls access into the interior of the mesh bag 101.

In the first potential embodiment of the disclosure, the access structure 102 comprises an oval ring 121. The oval ring 121 is a rigid loop shaped structure. The opening 111 of the mesh bag 101 is attached to the oval ring 121. The rigid structure of the oval ring 121 stabilizes the opening 111 such that hands free access to the interior of the mesh bag 101 can be assured.

In a second potential embodiment of the disclosure, the access structure 102 comprises a drawstring 131 and a stabilizer 132. The drawstring 131 comprises a channel 133 and a cord 134.

The purpose of the drawstring 131 is to close both the mesh bag 101 and the disposable trash bag 154 that lines the interior surface of the mesh bag 101 such that the contents of the disposable trash bag 154 may be securely transported for disposal. The drawstring 131 is a device that can be used to close the mesh bag 101. The stabilizer 132 is a rigid plate that is attached to the channel 133. The one or more hooks 103 attach to the access structure 102 by attaching to the stabilizer 132. The channel 133 is a tubular passage that is formed from a textile. Methods to form tubular textiles are well known in the textile arts. The channel 133 attaches to the perimeter of the opening 111 of the mesh bag 101. The cord 134 is a commercially available linear device that is used to cinch the mesh bag 101 and the disposable trash bag 154 closed. In a third potential embodiment of the disclosure, a commercially available cord lock 135 is provisioned with the invention 100 to secure the invention 100 in a closed position.

The one or more hooks 103 comprises a collection of one or more individual hooks 141 that are used to attach the access structure 102 to the side window 152 of the automobile 151. The one or more hooks 103 comprises a collection of individual hooks 141. The individual hook 141 is a curved structure that is used to hang the invention 100 from the side window 152 of the automobile 151. The individual hook 141 comprises a protective cover 142.

The protective cover 142 is a polyurethane coating that is applied to the individual hook 141 such that the individual hook will not damage the side window 152 of the automobile 151.

To use the invention 100, the disposable trash bag 154 is placed within the mesh bag 101 such that the disposable trash bag 154 lines the interior surface of the mesh bag 101. The invention 100 is then hung from the side window 152 of the automobile 151 using the one or more hooks 103.

The following definitions were used in this disclosure:

Automobile: As used in this disclosure, an automobile is a road vehicle that that specializes in carrying passengers and light cargo loads. This definition is specifically intended to include vehicles generally referred to as pickup trucks, vans, minivans, and sport utility vehicles.

Bag: As used in this disclosure, a bag is a container made of a flexible material. The bag has a single opening which allows the bag to receive the items to be contained.

Channel: As used in this disclosure, a channel is a tubular passage through which an object or fluid is passed through.

Cord: As used in this disclosure, a cord is a long, thin, and flexible piece of string, line, rope, or wire. Cords are made from yarns, piles, or strands of material that are braided or twisted together or from a monofilament (such as fishing line). Cords have tensile strength but are too flexible to provide compressive strength and are not suitable for use in pushing objects. String, line, and rope are synonyms for cord. See strand or wire Cord Lock: As used in this disclosure, a cord lock is a device that is used to tighten cords or drawstrings without the use of knots.

Disposable: As used in this disclosure, disposable is an adjective that refers to an object that is designed and intended for a single use. Within this context, an object would be considered disposable if it is not reusable after its initial use.

Exterior: As used in this disclosure, the exterior is use as a relational term that implies that an object is not contained within the boundary of a structure or a space.

Hook: As used in this disclosure, a hook is an object that is curved or bent at an angle such that items can be hung on or caught by the object.

Inferior: As used in this disclosure, the term inferior refers to a directional reference that is parallel to and in the same direction as the force of gravity.

Loop: As used in this disclosure, a loop is the length of a first linear structure including, but not limited to, lines, cords, or ribbons, that is: 1) folded over and joined at the ends forming an enclosed space; or, 2) curved to form a closed or nearly closed space within the first linear structure. In both cases, the space formed within the first linear structure is such that a second linear structure such as a line, cord or a hook can be inserted through the space formed within the first linear structure. Within this disclosure, the first linear structure is said to be looped around the second linear structure.

Mesh: As used in this disclosure, the term mesh refers to an openwork fabric made from threads, yarns, cords, wires, or lines that are woven, knotted, or otherwise twisted or intertwined at regular intervals. Synonyms for mesh include net.

Oval: As used in this disclosure, an oval is a geometric shape that is formed in the shape of a "squished" circle similar in form to an ellipse. The difference between an oval and an ellipse is that an ellipse can be described by a mathematical formula while an oval has no such description.

Perimeter: As used in this disclosure, a perimeter is one or more curved or straight lines that bounds an enclosed area on a plane or surface. The perimeter of a circle is commonly referred to as a circumference.

Sheeting: As used in this disclosure, sheeting is a material, such as a textile, a plastic, or a metal foil, in the form of a thin flexible layer or layers.

Strip: As used in this disclosure, the term describes a long and narrow object of uniform thickness that appears thin relative to the length of the object. Strips are often rectangular in shape.

Textile: As used in this disclosure, a textile is a material that is woven, knitted, braided or felted. Synonyms in common usage for this definition include fabric and cloth.

Vehicle: As used in this disclosure, a vehicle is a motorized device that is used transporting carrying passengers, goods, or equipment. The term motorized vehicle refers to a vehicle can move under power provided by an electric motor or an internal combustion engine.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. An apparatus to facilitate manual packing of material comprising:
    a mesh bag, an access structure, and one or more hooks;
    wherein the one or more hooks and the mesh bag attach to the access structure;
    wherein the apparatus to facilitate manual packing of material is a sack holder;
    wherein the apparatus to facilitate manual packing of material is configured for use with a disposable trash bag;
    wherein the apparatus to facilitate manual packing of material is configured for use with an automobile;
    wherein the automobile is further defined with a body and a side window;
    wherein the apparatus to facilitate manual packing of material is attached to the side window such that the apparatus to facilitate manual packing of material hangs on the exterior side of the automobile;
    wherein the disposable trash bag is held within the mesh bag;
    wherein the access structure controls access to the interior of the mesh bag;
    wherein the access structure attaches to the opening of the mesh bag;
    wherein the access structure comprises a rigid oval ring;
    wherein the oval ring is a rigid loop shaped structure;
    wherein the opening of the mesh bag is attached to the oval ring;
    wherein the mesh bag is formed from a mesh textile;
    wherein the mesh bag is further defined with an opening;
    wherein the one or more hooks comprises a collection of one or more individual hooks;
    wherein each individual hook is a curved structure;
    wherein the individual hook further comprises a polyurethane coating;
    wherein the one or more hooks attach to the oval ring;
    wherein the access structure comprises a drawstring and a stabilizer;
    wherein the stabilizer attaches the one or more hooks to the drawstring.

2. The apparatus to facilitate manual packing of material according to claim 1
    wherein the drawstring comprises a channel and a cord;
    wherein the cord is inserted within the channel;
    wherein the drawstring is to close both the mesh bag and the disposable trash bag that lines the interior surface of the mesh bag.

3. The apparatus to facilitate manual packing of material according to claim 2
    wherein the stabilizer is a rigid plate;
    wherein the stabilizer attaches to the channel;
    wherein the one or more hooks attach to the access structure by attaching to the stabilizer.

4. The apparatus to facilitate manual packing of material according to claim 3
    wherein the channel is a tubular passage that is formed from a textile;
    wherein the channel attaches to the perimeter of the opening of the mesh bag.

5. The apparatus to facilitate manual packing of material according to claim 4 wherein the drawstring further comprises a cord lock.

6. The apparatus to facilitate manual packing of material according to claim 5
    wherein the one or more hooks comprises a collection of one or more individual hooks;
    wherein each individual hook is a curved structure;
    wherein the individual hook further comprises a polyurethane coating.

7. The apparatus to facilitate manual packing of material according to claim 6
    wherein the mesh bag is formed from a mesh textile;
    wherein the mesh bag is further defined with an opening.

8. The apparatus to facilitate manual packing of material according to claim 1
    wherein the access structure comprises a drawstring;
    wherein the drawstring comprises a channel and a cord;
    wherein the cord is inserted within the channel;
    wherein the drawstring is to close both the mesh bag and the disposable trash bag that lines the interior surface of the mesh bag.

9. The apparatus to facilitate manual packing of material according to claim 8
    wherein the channel is a tubular passage that is formed from a textile;
    wherein the channel attaches to the perimeter of the mesh bag.

10. The apparatus to facilitate manual packing of material according to claim 9 wherein the drawstring further comprises a cord lock.

11. The apparatus to facilitate manual packing of material according to claim 10
    wherein the one or more hooks comprises a collection of one or more individual hooks;
    wherein each individual hook is a curved structure;
    wherein the individual hook further comprises a polyurethane coating.

12. The apparatus to facilitate manual packing of material according to claim 11 wherein the one or more hooks attach to the oval ring.

13. The apparatus to facilitate manual packing of material according to claim 12
    wherein the mesh bag is formed from a mesh textile;
    wherein the mesh bag is further defined with an opening.

* * * * *